US012573603B2

(12) United States Patent
Hashiguchi

(10) Patent No.: US 12,573,603 B2
(45) Date of Patent: Mar. 10, 2026

(54) ION ANALYZER

(71) Applicant: SHIMADZU CORPORATION, Kyoto (JP)

(72) Inventor: Yoshimi Hashiguchi, Kyoto (JP)

(73) Assignee: SHIMADZU CORPORATION, Kyoto (JP)

( * ) Notice: Subject to any disclaimer, the term of this patent is extended or adjusted under 35 U.S.C. 154(b) by 387 days.

(21) Appl. No.: 18/167,226

(22) Filed: Feb. 10, 2023

(65) Prior Publication Data

US 2023/0260774 A1 Aug. 17, 2023

(30) Foreign Application Priority Data

Feb. 14, 2022 (JP) ................................ 2022-020705

(51) Int. Cl.
*H01J 49/14* (2006.01)
*H01J 49/04* (2006.01)

(52) U.S. Cl.
CPC ............ *H01J 49/14* (2013.01); *H01J 49/045* (2013.01); *H01J 49/0468* (2013.01)

(58) Field of Classification Search
None
See application file for complete search history.

(56) References Cited

U.S. PATENT DOCUMENTS

2010/0224695 A1* 9/2010 Wu ....................... B05B 5/0255 239/3
2014/0332695 A1* 11/2014 McEwen ................ H01J 49/10 250/423 R
2016/0086784 A1* 3/2016 Brekenfeld ......... H01J 49/0422 250/423 R
2017/0011897 A1* 1/2017 Yamaguchi ......... H01J 49/0431
2017/0148617 A1* 5/2017 Akiyama ................ H01J 49/10
2021/0358734 A1* 11/2021 Hasegawa .......... G01N 30/7266
2021/0398789 A1* 12/2021 Trivett .................. H01J 49/045

FOREIGN PATENT DOCUMENTS

JP 2021089227 A * 6/2021
WO WO-2018055815 A1 * 3/2018 .......... H01J 49/0404

OTHER PUBLICATIONS

English machine translation for JP-2021089227-A (Year: 2021).*
English machine translation for WO-2018055815-A1 (Year: 2018).*

* cited by examiner

*Primary Examiner* — Wyatt A Stoffa
*Assistant Examiner* — Alina Kaliszewski
(74) *Attorney, Agent, or Firm* — Sughrue Mion, PLLC

(57) ABSTRACT

A mass spectrometer (ion analyzer) includes: an ionization chamber; a sample probe fixed to a wall of the ionization chamber and configured to nebulize a liquid sample into the ionization chamber; a gas heater including a tubular member having both end walls and a peripheral wall, a heater configured to heat the inside of the tubular member, a gas flow inlet and a gas flow outlet provided in the peripheral wall or the end wall of the tubular member, and a gas flow outlet pipe having one end connected to the gas flow outlet and the other end inserted into the ionization chamber; a fixture configured to fix the gas heater to the wall of the ionization chamber; and a cooling unit configured to cool the fixture.

5 Claims, 3 Drawing Sheets

ION ANALYZER

TECHNICAL FIELD

The present invention relates to an ion analyzer such as a mass spectrometer or an ion mobility analyzer.

BACKGROUND ART

A mass spectrometer used in combination with a liquid chromatograph generally has an ionization chamber which ionizes components in a liquid sample eluted from a column of the liquid chromatograph under a substantially atmospheric pressure atmosphere. Together with nebulizer gas for nebulizing the liquid sample, heating gas heated to a high temperature (for example, about 400° C.) is introduced into the ionization chamber in order to promote vaporization (desolvation) of the solvent from a nebulized liquid sample.

Patent Literature 1 describes an ion analyzer provided with a gas heater, where the gas heater includes a tubular member having both end walls and a peripheral wall, a heater to heat the inside of the tubular member, a gas flow inlet and a gas flow outlet provided in the peripheral wall or the end wall of the tubular member, and a gas flow outlet pipe (named "second tubular member" in Patent Literature 1) having one end connected to the gas flow outlet and the other end inserted into an ionization chamber. In this gas heater, gas is introduced from a gas flow inlet while the inside of the tubular member is heated by the heater, and the gas (heating gas) heated in the tubular member is introduced from the gas flow outlet into the ionization chamber through the gas flow outlet pipe.

CITATION LIST

Patent Literature

Patent Literature 1: JP 2021-089227 A

SUMMARY OF INVENTION

Technical Problem

In an ion analyzer described in Patent Literature 1, it is necessary to introduce the heating gas into a predetermined position in the vicinity of the liquid sample nebulized into the ionization chamber together with the nebulizer gas. Both a sample probe for nebulizing the liquid sample and the gas heater are fixed to a wall of the ionization chamber so that the positional relationship between the nebulized liquid sample and the heating gas does not separate. In such a configuration, since not only the gas but also the tubular member of the gas heater is heated by the heater, the heat of the tubular member is conducted to the sample probe fixed to the wall via the wall of the ionization chamber to which the tubular member is attached, so that the sample probe is also heated. As a result, the liquid sample in the sample probe may boil and is intermittently ejected into the ionization chamber. This causes the intensity of the detection signal to fluctuate with time regardless of the amount of a component contained in the liquid sample.

Although the mass spectrometer has been described above as an example, the same problem occurs in other ion analyzers such as an ion mobility analyzer which ionizes and analyzes a liquid sample.

A problem to be solved by the present invention is to provide an ion analyzer capable of preventing a liquid sample from boiling in a sample probe.

Solution to Problem

An ion analyzer according to the present invention developed for solving the previously described problems includes:

- an ionization chamber;
- a sample probe fixed to a wall of the ionization chamber and configured to nebulize a liquid sample into the ionization chamber;
- a gas heater including a tubular member having both end walls and a peripheral wall, a heater configured to heat the inside of the tubular member, a gas flow inlet and a gas flow outlet provided in the peripheral wall or the end walls of the tubular member, and a gas flow outlet pipe having one end connected to the gas flow outlet and the other end inserted into the ionization chamber;
- a fixture configured to fix the gas heater to a wall of the ionization chamber; and
- a cooling unit configured to cool the fixture.

Advantageous Effects of Invention

According to the ion analyzer of the present invention, since the fixture that fixes the gas heater to the wall of the ionization chamber is cooled by the cooling unit, the heat of the tubular member of the gas heater is prevented from being conducted to the sample probe through the fixture and the wall of the ionization chamber, which can prevent the liquid sample from boiling in the sample probe.

DESCRIPTION OF EMBODIMENTS

Embodiments of an ion analyzer according to the present invention will be described with reference to FIGS. 1 to 5.

Figure 1:
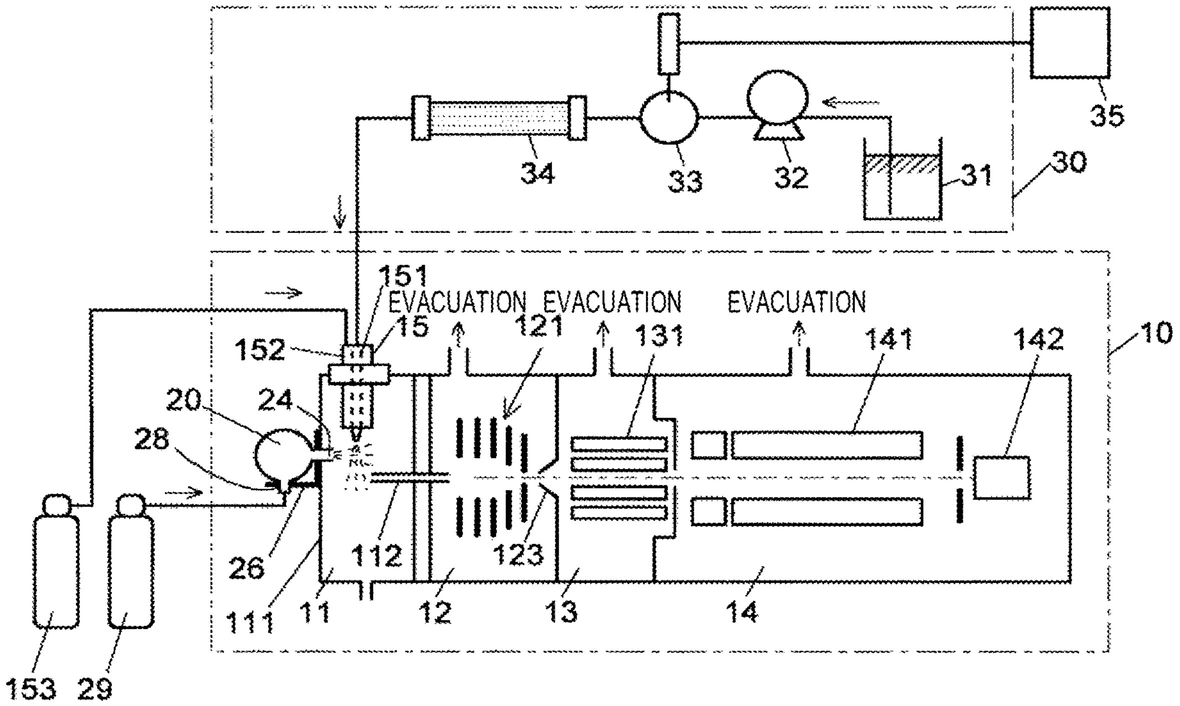
FIG. 1 is a schematic configuration diagram of a mass spectrometer which is an embodiment of an ion analyzer according to the present invention.

(1) Configuration of an Embodiment of Mass Spectrometer (Ion Analyzer) According to the Present Invention FIG. 1 illustrates a schematic configuration of a mass spectrometer 10 that is an ion analyzer of the present embodiment. The mass spectrometer 10 has a configuration of a multi-stage differential evacuation system including an ionization chamber 11 at substantially atmospheric pressure, a high-vacuum analysis chamber 14 evacuated by a vacuum pump, and a first intermediate vacuum chamber 12 and a second intermediate vacuum chamber 13 provided between the ionization chamber 11 and the analysis chamber 14 so that the degree of vacuum is increased stepwise. The ionization chamber 11 and the first intermediate vacuum chamber 12 communicate with each other via a capillary 112 with a small diameter. The first intermediate vacuum chamber 12 and the second intermediate vacuum chamber 13 are separated from each other by a skimmer 123 with a small hole at its top. The first intermediate vacuum chamber 12 and the second intermediate vacuum chamber 13 are respectively provided with ion guides 121 and 131 configured to transport ions to the subsequent stage while converging the ions. The analysis chamber 14 is provided with a quadrupole mass filter 141 and an ion detector 142. In the present embodiment, the walls (outer walls) of the ionization chamber 11, the first intermediate vacuum chamber 12, the second intermediate vacuum chamber 13, and the analysis chamber 14 are made of aluminum.

A sample probe (ionization probe) 15 is fixed to a wall 111 of the ionization chamber 11. The sample probe 15 includes a metal capillary 151 through which a liquid sample flows, and a nebulizer gas nozzle 152 having a tubular member coaxially provided outside the capillary 151. The vicinity of the tip of the capillary 151 and the nebulizer gas nozzle 152 is inserted into the ionization chamber 11. A power supply (not illustrated) that applies a voltage between the capillary 151 and the ground is connected to the capillary. A first gas cylinder 153 configured to supply a nebulizer gas is connected to the nebulizer gas nozzle 152. As a nebulizer gas, for example, nitrogen gas can be used.

Figure 2:
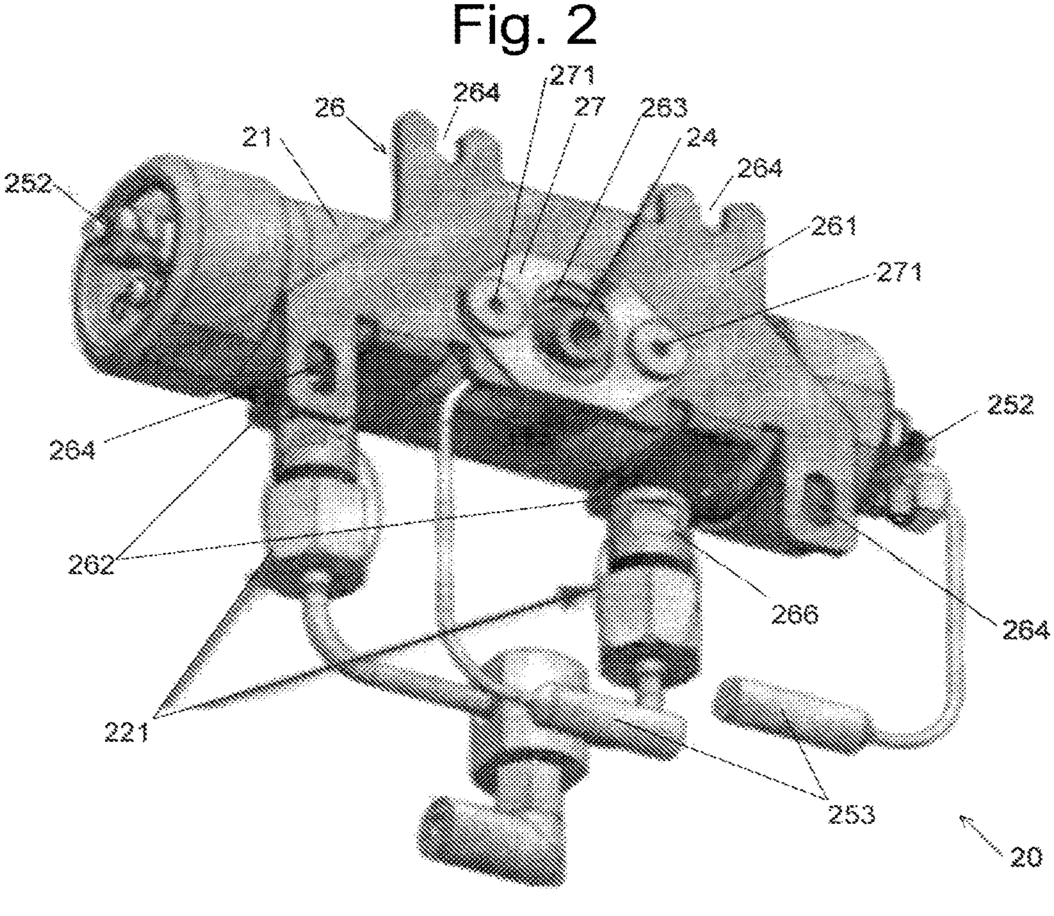
FIG. 2 is a perspective view of a gas heater included in the mass spectrometer of the present embodiment.
Figure 3:
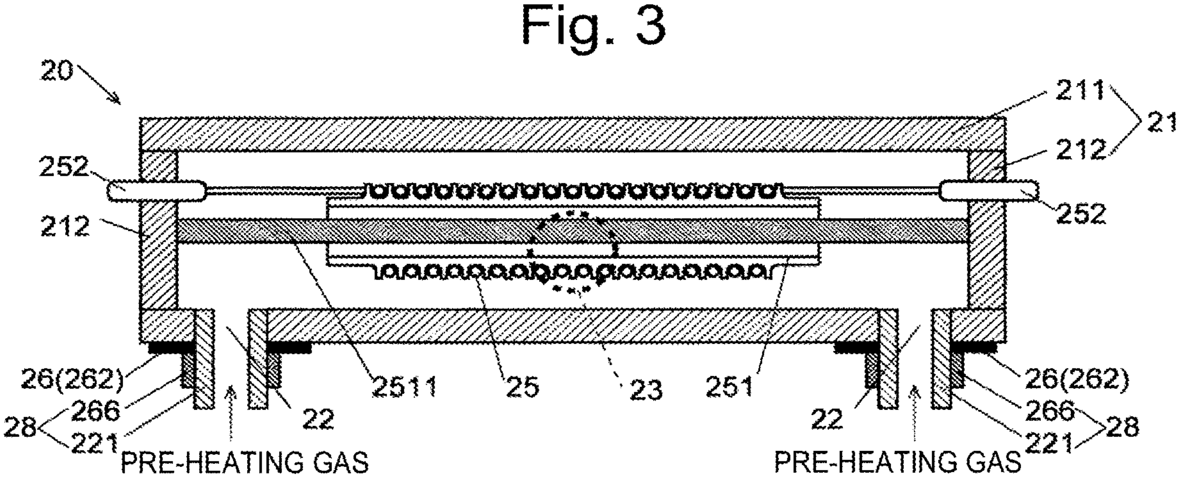
FIG. 3 is a cross-sectional view of the gas heater included in the mass spectrometer of the present embodiment.
Figure 4:
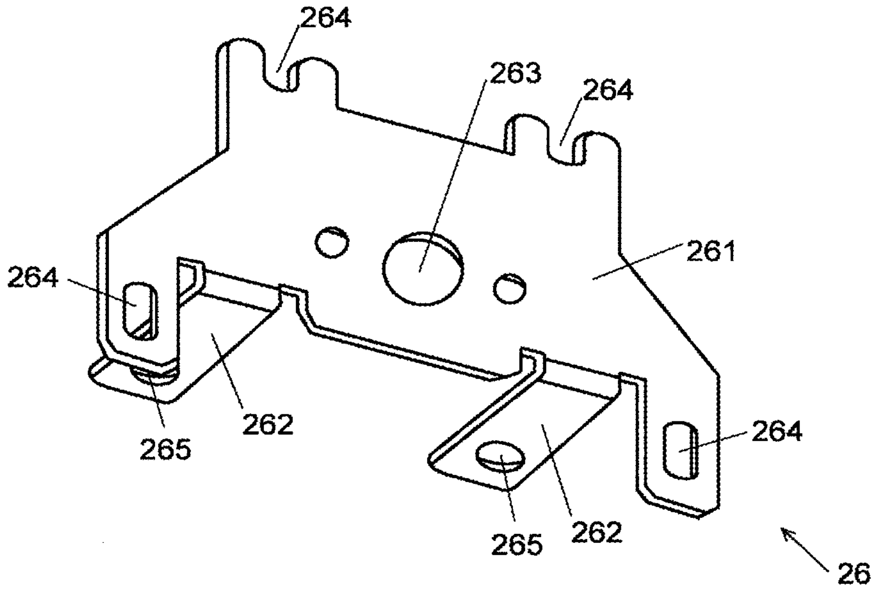
FIG. 4 is a perspective view of a fixture included in the mass spectrometer of the present embodiment.

The mass spectrometer 10 further includes a gas heater 20. The gas heater 20 is configured to heat a gas (different from the nebulizer gas) and supply the gas into the ionization chamber 11. Hereinafter, the gas before being heated by the gas heater 20 is referred to as "pre-heating gas", and the pre-heating gas heated by the gas heater 20 is referred to as "heating gas". As illustrated in FIGS. 2 and 3, the gas heater 20 according to the present embodiment includes a cylindrical tubular member 21, two gas flow inlets 22, a gas flow outlet 23, a gas flow outlet pipe 24, and a heater 25.

The tubular member 21 has a peripheral wall 211 and two end walls 212 that airtightly close both ends of the tubular member 21. Both the peripheral wall 211 and the end wall 212 are made of stainless steel. The two gas flow inlets 22 are provided one by one in the peripheral walls 211 near both ends of the tubular member 21, respectively. A gas flow inlet pipe 221 is connected to each of the gas flow inlets 22 outside the tubular member 21. The gas flow outlet 23 is provided in the peripheral wall 211 at the center in the longitudinal direction of the tubular member 21. In the present embodiment, the circumferential position of the gas flow outlet 23 is shifted by 70° from the circumferential position of the gas flow inlet 22.

One end of the gas flow outlet pipe 24 is connected to the gas flow outlet 23 outside the tubular member 21. The other end side of the gas flow outlet pipe 24 is inserted into the ionization chamber 11 through a hole provided in the wall 111 of the ionization chamber 11.

The heater 25 is formed of a nichrome wire, and is wound around an outer surface of a peripheral wall of a ceramic bobbin 251 having an outer diameter smaller than an inner diameter of the tubular member 21, to form a coil. The bobbin 251 is provided with a plate member 2511 having a width substantially equal to its inner diameter so as to penetrate the inside, and both ends of the plate member 2511 are fixed to the inner surfaces of the two end walls 212 to be held in the tubular member 21. Note that FIG. 3 illustrates a cross section parallel to the axis of the gas flow inlet pipe 221, and the plate member 2511 is illustrated as a cross section inclined with respect to its plate surface. The heater 25 is connected to terminals 252 provided on both end walls 212, and an electric current is supplied through the terminals 252. In addition, a thermocouple (not illustrated because it is not in the cross section of FIG. 3) is disposed in the tubular member 21, and is connected to terminals 253 (FIG. 2) provided outside the tubular member 21.

The gas heater 20 is fixed to the wall 111 of the ionization chamber 11 by a fixture 26. The fixture 26 is obtained by processing a stainless steel plate material, and includes a main portion 261 having a plate-like shape and fixed while being in contact with the wall 111 of the ionization chamber 11, and a cooled portion 262 having a plate-like shape and bent 90° with respect to the main portion 261 (see FIGS. 2 and 4).

The main portion 261 is provided with a gas flow outlet pipe passage hole 263 which is a hole through which the gas flow outlet pipe 24 passes. When the gas flow outlet pipe 24 and the wall 111 of the ionization chamber 11 are in contact with each other, the heat of the heating gas flowing in the gas flow outlet pipe 24 is easily conducted to the wall 111 of the ionization chamber 11. Therefore, in the present embodiment, the diameter of the gas flow outlet pipe passage hole 263 is made larger than the outer diameter of the gas flow outlet pipe 24 so that the edge of the gas flow outlet pipe passage hole 263 and the side surface of the gas flow outlet pipe 24 are not in contact with each other.

In the present embodiment, two cooled portions 262 are provided separately from each other. Each of the two cooled portions 262 is provided with a gas flow inlet pipe passage hole 265 which is a hole through which the gas flow inlet pipe 221 passes and has a diameter substantially the same as the outer diameter of the gas flow inlet pipe 221. Furthermore, on the outer side of the gas flow inlet pipe 221, there is provided a retainer 266 that is externally threaded, has an inner diameter substantially the same as the outer diameter of the gas flow inlet pipe 221, and is internally threaded (in FIG. 2, the gas flow inlet pipe passage hole 265 is not illustrated because it is hidden by the retainer 266). The retainer 266 is pressed against the cooled portion 262 by being screwed into the gas flow inlet pipe 221. With such a structure, the fixture 26 is cooled by the pre-heating gas passing through the gas flow inlet pipe 221 via the edge of the gas flow inlet pipe passage hole 265 and the retainer 266. Therefore, the gas flow inlet pipes 221 and the retainer 266 function as the cooling unit 28.

A second gas cylinder 29 (FIG. 1) configured to supply a pre-heating gas is connected to the gas flow inlet pipe 221. As a pre-heating gas (and a heating gas which is heated pre-heating gas), for example, dry air or nitrogen gas can be used.

A surface contact portion 27 is provided around the gas flow outlet pipe passage hole 263 which is a part of the main portion 261. The surface contact portion 27 is made of stainless steel polished so as to have a surface smoother than that of the main portion 261, and is in surface contact with an outer wall surface of the wall 111 around a hole through which the gas flow outlet pipe 24 passes, which is provided in the wall 111 of the ionization chamber 11. The surface contact portion 27 prevents solid or liquid foreign matter from entering the ionization chamber 11 from the gas flow outlet pipe passage hole 263, and also prevents gas from flowing between the ionization chamber 11 and the outside through the gas flow outlet pipe passage hole 263. Note that the heating gas passing through the gas flow outlet pipe 24 is heated to about 400° C., whereby the gas flow outlet pipe 24 is also heated to about the same temperature, and therefore, the place of the gas flow outlet pipe passage hole 263 cannot be hermetically sealed using a sealing material with low heat resistance such as an O-ring. In addition, since the inside of the ionization chamber 11 is substantially at atmospheric pressure and some amount of gas is allowed to flow from and to the outside, there is no need to seal the ionization chamber in an airtight manner.

Figure 5:
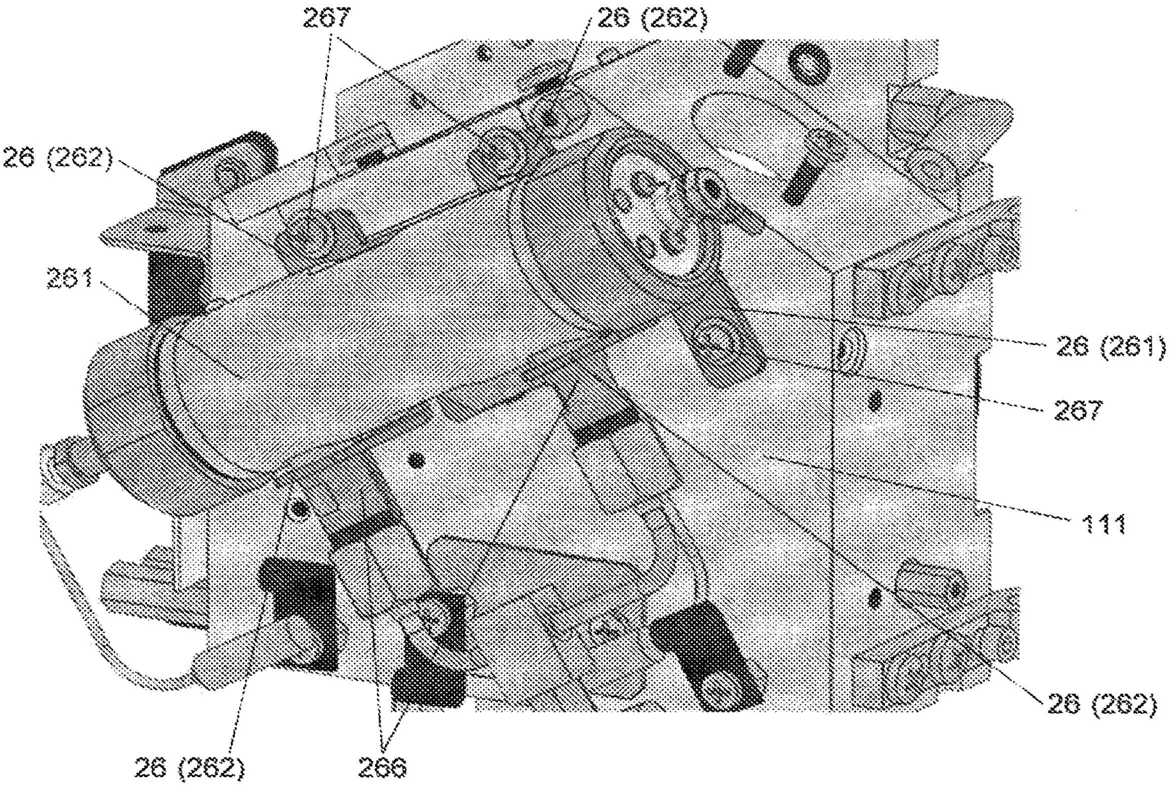
FIG. 5 is a partially enlarged perspective view illustrating a state in which the gas heater is attached to a wall of an ionization chamber in the mass spectrometer of the present embodiment.

The fixture 26 and the surface contact portion 27 are fixed to the peripheral wall 211 of the tubular member 21 by screws 271 that are common for the fixture 26 and the surface contact portion 27. In addition, the main portion 261 of the fixture 26 is provided with four screw passing portions 264 which are holes or slits through which screws 267 (see FIG. 5) that fix the fixture 26 to the wall 111 of the ionization chamber 11 pass. After the tubular member 21 is fixed to the fixture 26 using the screws 271, the fixture 26 is fixed to the wall 111 of the ionization chamber 11 using the screws 267, whereby the gas heater 20 is fixed to the wall 111 of the ionization chamber 11 (FIG. 5). The diameter (in the case of the hole) and the width (in the case of the slit) of the screw passing portion 264 are larger than the diameter of the screw 267, so that the gas heater 20 can be fixed after finely adjusting the position of the gas flow outlet pipe 24 in the ionization chamber 11. Note that the wall 111 of the ionization chamber 11 is provided with recesses at positions corresponding to the heads of the screws 271, and the heads of the screws 271 do not interfere with bringing the surface contact portion 27 into surface contact with the wall 111 of the ionization chamber 11.

An outlet of a column 34 of a liquid chromatograph 30 is connected to the capillary 151 (FIG. 1). In addition to the column 34, the liquid chromatograph 30 includes a mobile-phase container 31 in which a mobile phase is reserved, a pump 32 configured to suck the mobile phase and deliver the mobile phase at a constant flow rate (or flow velocity), and an injector 33 configured to supply a predetermined amount of sample stock solution into the mobile phase. The column 34 is configured to temporally separate components contained in the sample stock solution. The liquid sample including the components of the sample stock solution and the mobile phase flowing out of the column 34 is introduced into the capillary 151. In addition, to the liquid chromatograph 30, an autosampler 35 that introduces a plurality of liquid samples one by one into the injector 33 is connected.

(2) Operation of the Mass Spectrometer of the Present Embodiment

The mass spectrometer 10 of the present embodiment operates similarly to a conventional mass spectrometer except for the gas heater 20 and its peripheral components (fixture 26, cooling unit 28, and the like). Therefore, hereinafter, the operation of the gas heater and the components around the gas heater 20 will be mainly described, and the operation of the other components of the mass spectrometer 10 will be described only schematically.

In the liquid chromatograph 30, a liquid sample in which components contained in a sample stock solution are temporally separated as in the conventional case flows out from the column 34 and is introduced into the capillary 151 of the sample probe 15. In the sample probe 15, the liquid sample is discharged from the tip of the capillary 151, and the nebulizer gas supplied from the first gas cylinder 153 is discharged from the tip of the nebulizer gas nozzle 152, whereby the atomized liquid sample is nebulized into the ionization chamber 11.

In addition, the pre-heating gas at room temperature is supplied from the second gas cylinder 29 into the tubular member 21 of the gas heater 20 through the gas flow inlet pipe 221. In the tubular member 21, heat is generated from the heater 25 by applying an electric current to the heater 25, and the pre-heating gas is heated. The gas heated to a predetermined temperature (for example, about 400° C.) in the tubular member 21 is introduced as a heating gas from the gas flow outlet pipe 24 into the ionization chamber 11.

By introducing the heating gas into the ionization chamber 11 in this manner, desolvation of the liquid sample nebulized from the sample probe 15 into the ionization chamber 11 is promoted. At the same time, ions are generated from the liquid sample by applying a voltage between the capillary 151 and the ground. The ions from which the solvent is thus desorbed pass through the first intermediate vacuum chamber 12 and the second intermediate vacuum chamber 13 while being converged by the ion guides 121 and 131, and are introduced into the analysis chamber 14. In the analysis chamber 14, only ions having a specific mass-to-charge ratio are allowed to pass or the mass-to-charge ratio of ions allowed to pass is scanned within a predetermined range by the quadrupole mass filter 141, and the ions that have passed through the quadrupole mass filter 141 are detected by the ion detector 142.

Here, in the gas heater 20, as the gas in the tubular member 21 is heated, the tubular member 21 itself is also heated. If heat is conducted from the tubular member 21 heated in this manner to the sample probe 15 via the fixture 26 and the wall 111 of the ionization chamber 11, the liquid sample in the sample probe 15 boils, whereby the liquid sample is intermittently ejected from the sample probe 15, which makes the detection signal unstable. However, in the present embodiment, since the gas flow inlet pipe 221 and the retainer 266, which are the cooling unit 28, are in thermal contact with the cooled portion 262 of the fixture 26, the fixture 26 is cooled by the pre-heating gas flowing in the gas flow inlet pipe 221. Therefore, the sample probe 15 can be prevented from being heated by the heat of the tubular member 21 of the gas heater 20, and thus the liquid sample in the sample probe 15 can be prevented from boiling. In addition, since the heat of the fixture 26 is recovered into the pre-heating gas to contribute to heat the pre-heating gas and obtain the heating gas, heat utilization efficiency can be increased.

Considering only the point of suppressing heat conduction through the fixture 26, it is also conceivable to use a fixture 26 made of a material (heat insulating material) having a high heat insulating property. However, since the heat insulating material is generally brittler than metal, it is difficult to process the heat insulating material into the one with a shape of the fixture 26, and a part of the heat insulating material may collapse during long-term use of the mass spectrometer 10 to form fine dregs, which may invade the ionization chamber 11 through a gap between a hole provided in the wall 111 of the ionization chamber 11 and the gas flow outlet pipe 24. In addition, since the heat insulating material is generally softer than metal, when a fixture made of the heat insulating material is used, the position and direction of the gas flow outlet pipe 24 change with time in the ionization chamber 11, whereby the positional relationship between the heating gas introduced into the ionization chamber 11 and the liquid sample is deviated, and the solvent cannot be appropriately removed. Therefore, it is preferable to use a metal for the fixture 26 which is a hard material that does not collapse even when used for a long period of time. And since metal generally conducts heat easily, it is preferable to cool the fixture 26 made of metal as in the present embodiment.

(3) Variation

The present invention is not limited to the above embodiment, and various variations are possible.

For example, in the above embodiment, the pre-heating gas flowing in the gas flow inlet pipe 221 is used as a refrigerant by bringing the gas flow inlet pipe 221 and the fixture 26 into thermal contact with each other, but instead, a pipe through which a liquid (for example, water) or a gas (for example, alternative chlorofluorocarbon gas) different from the pre-heating gas flows may be brought into thermal contact with the fixture 26. Alternatively, the fixture 26 may be brought into thermal contact with a solid heat bath.

The shape of the fixture 26 is not limited to that of the above embodiment, and may be any shape as long as the gas heater 20 can be fixed to the wall 111 of the ionization chamber 11. In addition, in the above embodiment, the gas heater 20 is fixed by one fixture 26, but two or more fixtures may be used, and the two or more fixtures may be cooled by the cooling unit.

The configuration of the gas heater 20 is not limited to that of the above embodiment. For example, in the above embodiment, the gas flow inlet 22 and the gas flow outlet 23 are arranged to be shifted by 70° in the circumferential direction of the tubular member 21, but they may be arranged to be shifted by 180° or an angle other than these in the circumferential direction. The positions of the gas flow inlet 22 and the gas flow outlet 23 in the longitudinal direction of the tubular member 21 are also not limited to the example of the above embodiment. In addition, the gas flow inlet 22 and/or the gas flow outlet 23 may be provided in the end wall 212 of the tubular member 21. The number of the gas flow inlets 22 is not limited to 2 in the above embodiment, and may be 1 or 3 or more. Furthermore, the heater is provided in the space inside the tubular member 21 in the above embodiment, but may be provided in the wall of the tubular member 21 or outside the tubular member 21. In addition, the heater 25 is not limited to the one made of the nichrome wire in the above embodiment, and any heater can be used as long as it heats the space inside the tubular member 21. The material of the tubular member 21 is not limited to the stainless steel in the above embodiment, and any material can be used as long as the material has resistance to the temperature of the gas in the tubular member 21. However, similarly to the fixture 26, it is preferable to use a metal material that does not collapse during long-term use as the material of the tubular member 21.

In addition, the configuration of the mass spectrometer and the configuration of the liquid chromatograph are not limited to those in the above embodiment, and can be appropriately modified. Alternatively, the present invention can also be applied to a mass spectrometer that is not used in combination with a liquid chromatograph. Furthermore, the present invention can also be applied to an ion analyzer other than a mass spectrometer, such as an ion mobility analyzer.

[Modes]

It will be understood by those skilled in the art that the exemplary embodiments described above are specific examples of the following modes.

(Clause 1)

An ion analyzer according to clause 1 includes:

an ionization chamber;

a sample probe fixed to a wall of the ionization chamber and configured to nebulize a liquid sample into the ionization chamber;

a gas heater including a tubular member having both end walls and a peripheral wall, a heater configured to heat an inside of the tubular member, a gas flow inlet and a gas flow outlet provided in the peripheral wall or the end walls of the tubular member, and a gas flow outlet pipe having one end connected to the gas flow outlet and the other end inserted into the ionization chamber;

a fixture configured to fix the gas heater to a wall of the ionization chamber; and a cooling unit configured to cool the fixture.

According to the ion analyzer of the clause 1, since the fixture that fixes the gas heater to the wall of the ionization chamber is cooled by the cooling unit, the heat of the tubular member of the gas heater is prevented from being conducted to the sample probe through the fixture and the wall of the ionization chamber, which can prevent the liquid sample from boiling in the sample probe.

(Clause 2)

An ion analyzer according to clause 2 is the ion analyzer according to clause 1, wherein the cooling unit includes a gas flow inlet pipe having one end connected to the gas flow inlet, and the fixture is in thermal contact with the gas flow inlet pipe.

With the ion analyzer according to clause 2, since the fixture is in thermal contact with the gas flow inlet pipe, the fixture is cooled by the pre-heat gas flowing in the gas flow inlet pipe. In addition, since the heat of the fixture is given to the pre-heat gas and contributes to obtaining the heating gas by heating the pre-heating gas, heat utilization efficiency is increased.

(Clause 3)

An ion analyzer according to clause 3 is the ion analyzer according to clause 1 or 2, wherein the fixture is made of metal.

As described above, when a fixture made of the heat insulating material is used, a part of the heat insulating material may collapse during long-term use to form dregs. On the other hand, with the ion analyzer according to clause 3, since the fixture is made of metal, the fixture does not collapse or form dregs during long-term use, and therefore such dregs do not invade or contaminate the inside of the ionization chamber. In addition, since the fixture made of metal is hardly deformed, the position of the gas flow outlet pipe is hardly displaced in the ionization chamber, and the positional relationship between the liquid sample nebulized from the sample probe and the heating gas supplied from the gas flow outlet pipe are prevented from being changed.

(Clause 4)

An ion analyzer according to clause 4 is the ion analyzer according to any one of clauses 1 to 3, wherein the fixture has a gas flow outlet pipe passage hole through which the gas flow outlet pipe passes and which has a diameter larger than an outer diameter of the gas flow outlet pipe.

With the ion analyzer according to clause 4, since the diameter of the gas flow outlet pipe passage hole is larger than the outer diameter of the gas flow outlet pipe, the gas heater can be attached to the wall of the ionization chamber with a fixture without bringing the side surface of the gas flow outlet pipe into contact with the edge of the gas flow outlet pipe passage hole. Therefore, the heat of the gas heater can be suppressed from being conducted from the gas flow outlet pipe to the fixture.

REFERENCE SIGNS LIST

10 . . . Mass Spectrometer
11 . . . Ionization Chamber
111 . . . Wall
112 . . . Capillary
12 . . . First Intermediate Vacuum Chamber
121, 131 . . . Ion Guide

123 . . . Skimmer
13 . . . Second Intermediate Vacuum Chamber
14 . . . Analysis Chamber
141 . . . Quadrupole Mass Filter
142 . . . Ion Detector
15 . . . Sample Probe
151 . . . Capillary
152 . . . Nebulizer Gas Nozzle
153 . . . First Gas Cylinder
20 . . . Gas Heater
21 . . . Tubular Member
211 . . . Peripheral Wall of Tubular Member
212 . . . End Wall of Tubular Member
22 . . . Gas Flow Inlet
221 . . . Gas Flow Inlet Pipe
23 . . . Gas Flow Outlet
24 . . . Gas Flow Outlet Pipe
25 . . . Heater
251 . . . Bobbin
2511 . . . Plate Member Fixing Bobbin
252 . . . Terminal of Heater
253 . . . Terminal of Thermocouple
26 . . . Fixture
261 . . . Main Portion of Fixture
262 . . . Cooled Portion of Fixture
263 . . . Gas Flow Outlet Pipe Passage Hole
264 . . . Screw Passage Portion
265 . . . Gas Flow Inlet Pipe Passage Hole
266 . . . Retainer
267, 271 . . . Screw
27 . . . Surface Contact Portion
28 . . . Cooling Unit
29 . . . Second Gas Cylinder
30 . . . Liquid Chromatograph
31 . . . Mobile Phase Container
32 . . . Pump
33 . . . Injector
34 . . . Column
35 . . . Autosampler

The invention claimed is:

1. An ion analyzer comprising:

an ionization chamber;

a sample probe fixed to a wall of the ionization chamber and configured to nebulize a liquid sample into the ionization chamber;

a gas heater including a tubular member having end walls at respective ends of the tubular member and a peripheral wall, a heater configured to heat an inside of the tubular member, a gas flow inlet and a gas flow outlet provided in the peripheral wall or one of the end walls of the tubular member, and a gas flow outlet pipe configured to provide heated gas, the gas flow outlet pipe having one end connected to the gas flow outlet and the other end inserted into the ionization chamber;

a fixture fixing the gas heater to a wall of the ionization chamber such that the heated gas is introduced into a predetermined position in a vicinity of the liquid sample nebulized into the ionization chamber by the sample probe; and a cooling unit configured to cool the fixture, wherein conduction of heat generated in the tubular member when the heated gas is provided by using the heater to the sample probe through the fixture and the wall of the ionization chamber is suppressed by cooling the fixture with the cooling unit.

2. The ion analyzer according to claim 1, wherein the cooling unit includes a gas flow inlet pipe having one end connected to the gas flow inlet, and the fixture is in thermal contact with the gas flow inlet pipe.

3. The ion analyzer according to claim 1, wherein the fixture is made of metal.

4. The ion analyzer according to claim 1, wherein the fixture has a gas flow outlet pipe passage hole through which the gas flow outlet pipe passes and which has a diameter larger than an outer diameter of the gas flow outlet pipe.

5. The ion analyzer according to claim 1, wherein:

the cooling unit includes a gas flow inlet pipe through which a pre-heating gas flows;

the gas heater is fixed to an outer wall of the ionization chamber by the fixture; and the fixture includes a first portion having a plate-like shape and a second portion protruding outwardly from the first portion, the first portion being in physical contact with the outer wall of the ionization chamber, and the second portion being thermally coupled with the gas flow inlet pipe of the cooling unit.

* * * * *